US012777295B2

(12) United States Patent
Møller et al.

(10) Patent No.: US 12,777,295 B2
(45) **Date of Patent: *Oct. 27, 2026**

(54) ASSEMBLY FOR HEARING AID

(71) Applicant: Oticon A/S, Smørum (DK)

(72) Inventors: Kenneth Rueskov Møller, Smørum (DK); Jens Troelsen, Smørum (DK); Rune Sø, Smørum (DK); Oliver Sundberg, København N (DK); Finn Danielsen, Smørum (DK); Jesper B. Johansen, Smørum (DK); Mads Sager, Smørum (DK); Svend Oscar Petersen, Smørum (DK); Bent Jakobsen, Smørum (DK)

(73) Assignee: Oticon A/S, Smørum (DK)

( * ) Notice: Subject to any disclaimer, the term of this patent is extended or adjusted under 35 U.S.C. 154(b) by 146 days.

This patent is subject to a terminal disclaimer.

(21) Appl. No.: 18/821,678

(22) Filed: Aug. 30, 2024

(65) Prior Publication Data

US 2024/0422490 A1 Dec. 19, 2024

Related U.S. Application Data

(63) Continuation of application No. 18/236,763, filed on Aug. 22, 2023, now Pat. No. 12,108,221, which is a (Continued)

(30) Foreign Application Priority Data

Dec. 29, 2016 (EP) .................................... 16207295
Dec. 29, 2016 (EP) .................................... 16207304
(Continued)

(51) Int. Cl.
*H04R 25/00* (2006.01)

(52) U.S. Cl.
CPC ......... *H04R 25/607* (2019.05); *H04R 25/505* (2013.01); *H04R 25/55* (2013.01);
(Continued)

(58) Field of Classification Search
CPC .... H04R 25/607; H04R 25/505; H04R 25/55; H04R 25/554; H04R 25/65;
(Continued)

(56) References Cited

U.S. PATENT DOCUMENTS 6,337,667 B1 1/2002 Ayala et al.
6,778,139 B2 8/2004 Suzuki et al.
(Continued)

FOREIGN PATENT DOCUMENTS

EP 1 531 649 A2 5/2005
EP 1 496 530 B1 10/2006
(Continued)

*Primary Examiner* — Sunita Joshi
(74) *Attorney, Agent, or Firm* — Birch, Stewart, Kolasch & Birch, LLP

(57) ABSTRACT

An assembly for a hearing aid is disclosed. The hearing aid with the assembly includes an in the ear part and a behind the ear part and a part mechanically interconnecting the two parts. In the interconnection, a flexible substrate is arranged. The flexible substrate includes conductive paths. The conductive paths may be used for communication between the in the ear part and the behind the ear part, and/or for an antenna function.

19 Claims, 11 Drawing Sheets

Related U.S. Application Data continuation of application No. 17/362,099, filed on Jun. 29, 2021, now Pat. No. 11,765,530, which is a continuation of application No. 16/927,560, filed on Jul. 13, 2020, now Pat. No. 11,089,414, which is a continuation of application No. 15/857,035, filed on Dec. 28, 2017, now Pat. No. 10,743,118.

(30) Foreign Application Priority Data

| | | |
|---|---|---|
| Feb. 8, 2017 | (EP) | 17155097 |
| Feb. 8, 2017 | (EP) | 17155099 |
| Mar. 14, 2017 | (EP) | 17160848 |

(52) U.S. Cl.
CPC ........... *H04R 25/554* (2013.01); *H04R 25/65* (2013.01); *H04R 2225/0216* (2019.05); *H04R 2225/025* (2013.01); *H04R 2225/51* (2013.01)

(58) Field of Classification Search
CPC ...... H04R 2225/0216; H04R 2225/025; H04R 2225/51
See application file for complete search history.

(56) References Cited

U.S. PATENT DOCUMENTS

| | | | | |
|---|---|---|---|---|
| 7,394,911 | B2 | 7/2008 | Joergensen et al. | |
| 7,859,469 | B1 | 12/2010 | Rosener et al. | |
| 7,946,890 | B1 | 5/2011 | Bondo et al. | |
| 8,798,294 | B2 | 8/2014 | Havenith et al. | |
| 10,743,118 | B2 | 8/2020 | Moller et al. | |
| 2006/0227989 | A1 | 10/2006 | Polinske | |
| 2007/0071262 | A1 | 3/2007 | Rass | |
| 2008/0272980 | A1 | 11/2008 | Adel et al. | |
| 2009/0169038 | A1 | 7/2009 | Knudsen et al. | |
| 2009/0177097 | A1* | 7/2009 | Ma | G05B 15/02 600/500 |
| 2009/0196444 | A1 | 8/2009 | Solum | |
| 2009/0296969 | A1 | 12/2009 | Feeley et al. | |
| 2010/0124346 | A1* | 5/2010 | Higgins | H04R 25/02 439/86 |
| 2010/0158295 | A1 | 6/2010 | Polinske et al. | |
| 2010/0186995 | A1 | 7/2010 | Yeh | |
| 2010/0321269 | A1 | 12/2010 | Ishibana et al. | |
| 2011/0032165 | A1 | 2/2011 | Heng et al. | |
| 2011/0243357 | A1 | 10/2011 | Probst et al. | |
| 2013/0223664 | A1 | 8/2013 | Meskens et al. | |
| 2014/0119557 | A1* | 5/2014 | Goldstein | H04M 1/2471 381/74 |
| 2014/0185848 | A1* | 7/2014 | Ozden | H04R 25/55 381/315 |
| 2014/0328507 | A1 | 11/2014 | Rabel et al. | |
| 2015/0296312 | A1 | 10/2015 | Sivantos et al. | |
| 2016/0173998 | A1 | 6/2016 | Bauman et al. | |
| 2016/0373867 | A1 | 12/2016 | Ozden | |

FOREIGN PATENT DOCUMENTS

| | | | |
|---|---|---|---|
| EP | 1708306 | A1 | 10/2006 |
| EP | 2 076 065 | A1 | 7/2009 |
| EP | 1 768 449 | B1 | 8/2009 |
| EP | 2088804 | A1 | 8/2009 |
| EP | 2 227 040 | A2 | 9/2010 |
| EP | 2 458 674 | A2 | 5/2012 |
| EP | 2 597 654 | A2 | 5/2013 |
| EP | 2 597 654 | A3 | 5/2013 |
| EP | 2 733 962 | A1 | 5/2014 |
| EP | 2 750 409 | A1 | 7/2014 |
| EP | 2 456 235 | B1 | 9/2015 |
| JP | 62-98594 | A | 5/1987 |
| WO | WO 2009/049646 | A1 | 4/2009 |
| WO | WO 2009/117778 | A1 | 10/2009 |
| WO | WO 2010/033932 | A1 | 3/2010 |
| WO | WO 2015/127972 | A1 | 9/2015 |

* cited by examiner

ASSEMBLY FOR HEARING AID

CROSS-REFERENCE TO RELATED APPLICATIONS

This application is a Continuation of application Ser. No. 18/236,763 filed on Aug. 22, 2023, which is a Continuation of application Ser. No. 17/362,099 filed on Jun. 29, 2021 (now U.S. Pat. No. 11,765,530 issued Sep. 19, 2023), which is a Continuation of application Ser. No. 16/927,560 filed on Jul. 13, 2020 (now U.S. Pat. No. 11,089,414 issued on Aug. 10, 2021), which is a Continuation of application Ser. No. 15/857,035 filed on Dec. 28, 2017 (now U.S. Pat. No. 10,743,118 issued on Aug. 11, 2020), which claims priority under 35 U.S.C. § 119 (a) to patents application Ser. Nos. 17160848.2, 17155099.9, 17155097.3, 16207304.3 and 16207295.3, filed in Europe on Mar. 14, 2017, Feb. 8, 2017, Feb. 8, 2017, Dec. 29, 2016 and Dec. 29, 2016, respectively. All of the above applications are hereby expressly incorporated by reference into the present application.

FIELD

The present disclosure relates to assemblies for hearing aids having a behind-the-ear part and an in-the-ear part, to a hearing aid and hearing aid system.

BACKGROUND

Modern hearing aids, or hearing aid devices, typically include digital electronics to enhance the wearer's listening experience. Hearing aids with airborne delivery of a signal that the user experiences as sound typically use transducer and electro-mechanical components, which are connected via wires to the hearing aid circuitry. In addition to transducers, hearing aids incorporate A/D converters, DAC's, signal processors, memory for processing the audio signals, and wireless communication systems. The components frequently include multiple housings or shells that are connected to assemble the hearing aid. A coating may be applied to the housing or parts of the housing, e.g. at crevices, to reduce the risk of moisture ingress, or other fluid substances, such as cerumen etc.

In hearing aids having a speaker unit, i.e. a transducer, positioned in the ear canal of the user, a so-called receiver-in-the-ear, or receiver in-the-canal, hearing aid a connecting element mechanically connecting a behind-the-ear element to an in-the-ear element may surprisingly additionally be the host of a range of elements, including an antenna element or combinations of multiple elements.

The antenna element may be part of a larger antenna structure or be the sole part of the antenna structure. When communicating wirelessly at radio frequencies, e.g. 2.4 GHz, 5 GHz or at least in the range generally from around 1 GHZ to around 10 GHz, to and/or from the hearing aid positioned at the ear, the head of the person wearing the hearing aid will attenuate the signal. Using the connecting element to host, at least part of, the antenna is advantageous. Using an antenna embedded in a part completely positioned behind the pinna may degrade the signal in certain directions, e.g. to/from the opposite side of the head.

Further, when including electrical components in the in-the-ear part, there is an increased need for, wired, communication bandwidth between the two parts, e.g. in the form of multiple wires.

The present disclosure provides a solution that addresses at least some of the above-mentioned problems. The present disclosure provides at least an alternative to the prior art.

The present disclosure provides, in a first aspect, an assembly for used with a hearing aid, wherein the assembly comprises a connector for mechanically interconnecting an in-the-ear part with a behind-the-ear part. Herein the term connector is used for both the part interconnecting an in-the-ear part with a behind-the-ear part, but also for the part of the connector that connects to the behind-the-ear part.

An object of the present disclosure is achieved by a hearing device comprising a first portion adapted for being arranged behind an ear of a user for providing a signal, an output transducer for converting the signal to an acoustic output, a coupling element coupling to the first portion, an antenna comprising an external antenna arranged at least externally to the first portion and an internal parasitic element, a feeding unit configured to supply a current to the external antenna, and the feeding unit is further configured to supply the current to the internal parasitic element via a wireless coupling, a wireless interface for receiving and/or transmitting data by means of the antenna, and wherein the coupling element comprises the external antenna, and wherein the coupling element comprises an electrically conducting element coupled to the wireless interface, and wherein the electrically conducting element is at least a part of the external antenna.

Further, in the housing of the first portion or first part, i.e. the behind-the-car part, a parasitic element may be present. Thus, the hearing device may comprise an antenna comprising an external antenna arranged at least externally to the first portion and an internal parasitic element arranged internally in the first portion, a feeding unit configured to supply a current to the external antenna. The advantage of combining the external antenna and the parasitic element is, at least, that the bandwidth of the antenna increases and that the obtained improvement of the bandwidth is obtained by not increasing the size of the hearing device. The parasitic element is then tuned to the operation frequency, or frequency band, of the hearing device.

The parasitic element, e.g. the internal parasitic element, may be part of the printed circuit board connected to a ground plane such that the parasitic element only receives a current via the magnetic coupling or via the capacitive coupling. The current from the feeding unit may be transferred via the ground plane and/or via the external antenna and wireless coupled to the parasitic element.

The parasitic element may be a passive element being electrically conductive and connected to the ground plane. An electrical length of the internal parasitic element may be $\lambda/4$ or $\lambda/4+x*\lambda/2$, where x is a number, such as 0, 1, 2, 3 etc. The electrical length of the internal parasitic element may be adapted to the ground plane and/or the external antenna. The electrical length may be any length, and where the impedance match between the internal parasitic element and the external antenna is obtained by an impedance matching circuit. The impedance matching circuit may comprise one or more capacitance and/or one or more coils. The impedance matching circuit may be connected to the internal parasitic element and ground plane or between the external antenna and the ground plane.

The connector, or plug, connecting the connector to the behind-the-car part may be a flex tab connector, e.g. a male flex tab. The plug may have a plug housing. Alternatively to the flex tab connector, the connector may comprise a plurality of pins extending parallel to each other in a direction perpendicular to a surface of the connector. For ensuring interoperability an adaptor may be provided, wherein the adaptor comprises a socket for connecting to the flex tab, and a plurality of pins corresponding to the desired number of connections in the behind-the-ear part. This will allow the connector with the flex tab to engage with other types of sockets. Between the flex connector and the pins of the adaptor suitable interconnections are provided. Preferably, 5 pins are provided, but the number may be different, such as higher than five. The adaptor may include a protrusion, or groove, to ensure that the adaptor does not rotate after being mounted in the behind-the-car part and/or connector, further, apart from reducing or preventing rotation the protrusion and/or groove may provide stress relief of rotational forces exerted on the pins. The adaptor may include a bend in the sense that the socket for the flex tab and the pins may form an angle, i.e. not extend parallel in substantially the same plane.

The receiver and the flexible substrate may connect so that a bended part of the flexible substrate connects to a surface part of the receiver. This may e.g. be an end surface of the receiver that connects to a bended end of the flexible substrate, which may for instance be bended around 90 degrees relative to the nearest part of the flexible substrate. In the alternative, or combined herewith, the receiver may comprise a part that extends so that a substantially flat surface part may be used to connect to the flexible substrate so that the flexible substrate part connecting to the receiver and surface part of the extending part of the receiver to connect to are substantially parallel.

The flexible substrate may extend into the plug housing where a number of vias connect pins to electrically conductors on or in the flexible substrate. This allow the flexible substrate to be used in embodiments where the connector comprises pins for connecting with e.g. an behind-the car part. To omit the vias, the pins may be soldered directly to the flexible substrate. The vias may be litz wires.

The connector is configured to establish electrical connection between the in-the-car part and the behind-the-car part. The electrical connection is established via two or more conductors formed at a flexible carrier having a protective cover or tubing. An output transducer may be included in the in-the-car part or in the behind-the-car part. The flex tab connector is electrically connected to the receiver and configured to mate with the receptacle connector to provide electrical connection between the receiver and the circuitry, and includes a flex substrate and conductive contacts constructed on the flex substrate. Flex tab connector is a bendable flex connector, could also be named a flexible connector, flex circuit connector, or flexible circuit connector, and may include conductive contacts constructed on a flex substrate, could also be termed as a flexible substrate, flex circuit substrate, or flexible circuit substrate. Conductive contacts, e.g. flex pads which may be made of mechanically flexible conductive traces such as copper traces, the connector is thus substantially bendable.

The present disclosure provides, in a second aspect, a hearing aid. The hearing aid may be of a kind comprising a first part configured to be positioned at or behind the car of a user and a second part configured to be positioned at or at least partly in the car canal of the user. These first and second parts may each comprise an appropriate housing. The first housing may be generally oblong and shaped so as to fit in the area between the pinna and the head of the user, in which position the first housing is less visible. The second housing may be shaped so as to provide a tight fit in the car canal, alternatively, a further device may be provided to establish contact to an inner wall of the car canal, e.g. such a device is sometimes referred to as a dome. The hearing aid may further comprise a third part connecting the first part and the second part. This third part provides mechanical connected between the first and the second part. The second part may comprise an output transducer configured to provide an acoustic signal to be provide to the user's ear canal. This could be a so-called receiver transforming an electrical signal to an acoustic signal. The electrical signal is most often provided from electronics in the first, i.e. the behind the car, part. The first part may comprise one or more, e.g. two, input transducers, such as microphones. The second part, i.e. the in the car part, may additionally comprise one or more input transducers, e.g. one facing towards the surroundings and alternatively or additionally one facing towards the area between the second housing and the tympanic membrane. The input transducer facing towards the surroundings could be used for detecting sounds to be processed so as to, at least partly, compensate for the users hearing loss. The hearing loss may be age dependent and/or noise induced. The compensation could be achieved by hearing assistance electronics, e.g. including a filter and an amplifier. The input transducer facing towards the tympanic membrane could be used for detecting various event such as own voice activity and/or for detecting/countering occlusion effects. The third part May comprise a transmission path configured to provide electrical connection between the first part and the second part. The transmission path may include several sub-paths, and may be separate from other electrical connections between the first and second parts. The transmission path may be a transmission line or even a multitude of transmission lines. The transmission path may be configured to conduct a signal from the first part to the second part, and/or vice versa. The first part may comprise various electronic components such as one or more signal processors for processing signals from the one or more input transducers, a power source, which may be rechargeable, communication devices such as transmission and reception devices, or any other kinds of electronic components needed in a hearing aid. Further, one or more filter banks for converting time domain audio signals into frequency domain may be included, as well as filter banks for reconverting back to time domain. Further, one or more electronic components may be included in the second housing, e.g. a signal processor for processing e.g. signals from an input transducer in the second housing, one or more memory devices, one or more processors for other purposes than signal processing or any other suitable electronic components. The transmission path may, at least partially, be established via a flexible substrate having a plurality of electrically conductive paths. The flexible substrate may have a length and a width. The width of the flexible substrate may be a diameter. Such a flexible substrate may be an oblong substrate that does not stretch much. Preferably, the flexible substrate is at least flexible in a direction perpendicular and/or to the top surface. If the flexible substrate has a generally rectangular cross-section, the flexibility may be present in the direction perpendicular to the long side of the rectangular cross-section as well as the direction perpendicular to the short side of the rectangular cross-section, while the substrate is not notably flexible along the length of the flexible substrate. The third part may further comprise a protective member mounted along the length of the flexible substrate. Advantageously the protective member surrounds the flexible substrate along the length, thereby protecting the flexible substrate from the environment. The protective member may further comprise strengthening fibers increasing the pull strength of the third part. The fibers may for instance be Aramide fibers. The fibers is contemplated in increase the tensile strength. When the hearing aid is to be mounted on or at the car, the user may grab the hearing aid at the third part enabling him or her to position the second part in the car canal opening or further into the car canal depending on the shape and form of the second part. Further, when dismounting the hearing aid the user may pull the third part so as to remove the second part from the opening of the car canal.

Using a flexible substrate as a carrier for electrical connection and/or communication between a behind-the-car part and an in-the-car part is advantageous in at least that a well-defined arrangement of the electrical connections is achieved, whereas when using twisted litze wires the exact relation between the wires is unknown, with possible undefined cross talk between the signals in the wires, whereas conductors embedded inside or at or on the surface of the flexible substrate is controllable and well-defined. Further, the impedance using the flexible substrate will be more well defined as well compared to the twisted litze wires.

The third part may be formed so that the protective cover includes a passageway conducting an airborne acoustic signal from an output unit in the first housing to the in-the-ear part, which has an output opening so as to output the airborne acoustic signal to the users ear canal. In such an arrangement the flexible substrate may be used, e.g., exclusively for an antenna function, or for establishing electrical connection to components in the in-the-ear part, e.g. input transducer or input transducers, processing unit or units, memory unit or units, or combinations or other types of units. Still further, an output transducer having both an in-the-ear speaker and a behind-the-ear speaker may be established.

The flexible substrate may have an overall, generally rectangular cross section. The cross-section of the flexible substrate may have another geometry and may optionally include minor other geometries, this could at least be in areas where optional electrical components are arranged at the surface of the flexible substrate. This could also include the area at the transmission path, where a conductor may be lowered, or embedded, relative to the surface of the flexible substrate.

Optionally, conductive path or paths may be formed at the short side of a flexible substrate having a rectangular shaped cross-section.

The hearing aid in general may include a variety, and possibly a plurality, of specialized electrical components. Such component or components could be one or more of gyrometer, thermometer, heart rate monitor, capacitor, inductor, resistor, integrated circuit e.g. asic, microphone, gyroscope, accelerometer, inclination sensor, compass, light sensor or any combinations thereof. The mentioned components may as an alternative or addition optionally be arranged in the housing of the first and/or second part.

The flexible substrate may be a multi-layer flexible circuit board where at least part of the plurality of transmission paths could be formed on respective opposite sides of the flexible substrate. This could e.g. be two long sides of a flexible substrates having a rectangular cross section. Alternatively, or in addition, one or more conductors could be formed in intermediate layers. Further, one or more electrical components may be embedded within the multi-layer flexible circuit board.

The hearing aid may further comprise a wireless interface and an antenna. This could e.g. enable wireless communication to other devices, advantageously using a protocol such as Bluetooth or Bluetooth Low Energy or other suitable protocol. Further advantageously, at least part of the antenna may be formed along the flexible substrate. This could allow the antenna to be at least partly exposed, i.e. not substantially covered by a part of the pinna or car canal. Placing the antenna inside the car canal is at some frequencies detrimental to the signal as the head will attenuate the signal substantially, at least in the direction through the head. Bringing the antenna as close to free space as possible lower losses in tissue of the head of the user, especially around e.g. 2.4 GHz. The antenna may include a part not being part of the third part, e.g. a part of the antenna may be formed inside the first part, this could e.g. be a wire or the like arranged inside the housing of the first part acting together with the part in the third part to form the antenna.

It could be advantageous to form at least part of the antenna using one, or more, of the electrically conductive paths on one surface of the flexible substrate. This allows predictable antenna properties and lowers variation from production. Alternatively, or in addition, a wire may be positioned along at least part of the length of the flexible substrate to be used as part of the antenna. The wire may e.g. be arranged in a spiral-like or helical-like geometry around at least part of the flexible substrate.

The antenna may extend at least part of the length of the flexible substrate. If the antenna is at least partly formed by a conductor in the flexible substrate a component may be position to terminate the antenna thereby providing a well-defined length of the antenna. The antenna may include an antenna trap. The trap could divide at least part of the length of the part of the flexible substrate where the antenna is formed so that the antenna is configured to operate at at least two different wavelengths, and thereby provide, in effect, two different modes of operation for the antenna. This could e.g. be used for communication where at one frequency data is received and where at another frequency data is sent. Further, the two modes could simply provide transmission and reception at two different wavelengths so that a transceiver or radio in the hearing aid could be operated at either frequency at any given time. This could for instance provide a carrier frequency of around 2.4 GHz and/or around 5.1 GHz. Other carrier frequencies could be supported. The well-defined length of the antenna, when looking e.g. at a set of connectors of different length, is particular useful in that the overall length of the connector may be different for different people as the size of cars and subsequently the needed distance between car canal and behind-the-car area. It could be so that the length of the antenna is shorter than the shortest length of a connector in a set of connectors each having different lengths. This would provide a uniform antenna performance for antennas in such a set of connectors. If the antenna length is tied to the length of the connector, the antenna performance will not be the same for a range of hearing aids. The conductor may also be terminated in other ways. An electrical component could be positioned at a position between the respective ends of the flexible substrate so as to isolate the antenna, i.e. so that the length of the antenna is only a part of the length of the flexible substrate. The wireless interface, e.g. a radio, may include a function for setting the wireless interface in a low power or off mode, e.g. a flight mode, so that the wireless interface does not emit power, or at least reduce the emission to a low level. The wireless interface may thus decode the signal received via an antenna, the decoding could include translating the received antenna signal to a digital signal and/or transforming it. This could be done to extend battery lifetime and/or comply with regulations of electromagnetic emission in specific areas e.g. in airplanes or hospitals.

The second part may include a first input transducer, and the hearing aid may further comprise a processor, either in the first part or in the second part, configured to process the output from the first input transducer so as to compensate for a hearing loss of the user. This processor could be composed of several processors each performing tasks. Appropriate memory units could also be included. The processing could include filtering, amplification, frequency transpositioning, feedback management, addition of e.g. tinnitus treatment signal, or other suitable processing.

The first part may further comprise a second input transducer, and the processor may then further be configured to establish a processed audio signal based on output from both the first input transducer and the second input transducer. This could e.g. enhance directionality of a system based on the two input transducers. Other functions such as own voice detection or occlusion detection may be performed using such as arrangement, however, an alternative number of input transducers may be used for these functions as well.

The first part may include a third input transducer, and the hearing aid may then comprise a processor, either in the first part and/or in the second part, configured to process the output from the input transducers so as to compensate for a hearing loss of the user. The processed output from the input transducer or input transducers may then be outputted to the user via the output transducer. This third input transducer may be the only input transducer of the hearing aid. Either of the first, second and/or third input transducers may comprise more elements, e.g. one omnidirectional microphone or two omnidirectional microphones or more omnidirectional microphones. Output from such at least two omnidirectional microphones may be combined for forming a directional microphone system, as outlined elsewhere in the present specification.

The input transducers mentioned here may be individual microphones or microphone systems each comprising two or more individual microphones. Further, two or more input transducers may be functionally combined to achieve the required functionality of the audio processing.

According to another aspect of the present disclosure a method of producing a connection member for a hearing aid is provided. The hearing aid may comprise a first part configured to be positioned at or behind the ear of a user and a second part configured to be positioned at or at least partly in the car canal of the user.

The method according to the other aspect may comprise providing a flexible substrate having a plurality of electrically conductive paths. The flexible substrate may for instance be relatively thin bendable material such as the so-called flex PCB The flexible substrate may have a first length along the longest side. The method may comprise providing a protective member having an elongated shape and an internal cavity. The protective cover may be added to protect, among others, the flexible substrate from the rather hostile environment at the car of a hearing aid. The protective member may have an initial length being smaller than the first length. This may be advantageous in processes where the protective member is subsequently stretched and thereby reduced in diameter. The method may comprise arranging the protective member and the flexible substrate so that the flexible substrate is located in the cavity of the protective member. The method may comprise stretching the protective member so as to elongate the protective member along the longest side of the flexible substrate thereby narrowing the cavity. By stretching the protective cover the diameter will reduce and may thereby conform to the size and shape of the flexible substrate. The stretching may be accomplished with the aid of clamps and or other holding or retention devices for ensuring that the protective cover does not slip while being stretched.

The method may comprise that the protective member is heated during and/or before stretching. This could help the stretching process by making the protective cover more soft and more easily deformable during the pulling process.

The method may further comprise providing a coating to the flexible substrate before mounting the protective member. The coating may provide enhanced protection to the flexible member from ingression of substances, such as sweat, cerumen and the like.

All or nay aspects and/or features mentioned herein may be combined, either individually or in combination with one or more of the other aspects and/or features.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
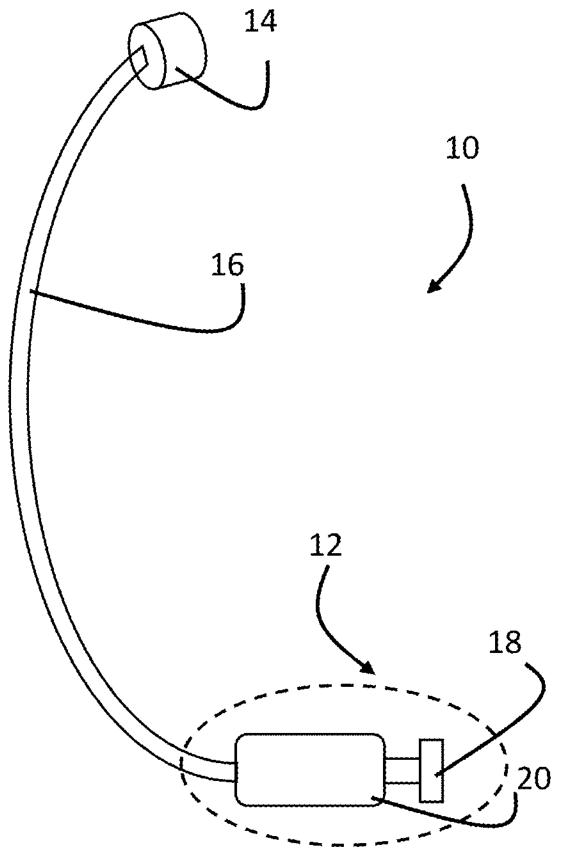
FIG. 1 schematically illustrates a speaker unit, or assembly, for a hearing aid, FIGS. 2 and 3 schematically illustrates cut-through views of parts of an assembly for connecting to a behind-the-ear part and including an in-the-ear-part, FIGS. 4-6 schematically illustrates ends of a flexible substrate, FIG. 7 schematically illustrates an electrical network, FIG. 8 schematically illustrates a protective cover in two stages, FIG. 9 schematically illustrates parts of the process of mounting a protective cover.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid may be construed as a device that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid is adapted to be worn in any known way. This may include i) arranging a unit of the hearing aid behind the ear with a tube leading an electrical signal to a speaker in the car canal such as in a Behind-the-Ear type hearing aid, and/or ii) arranging a unit of the hearing device attached to a fixture implanted into the skull bone such as in Bone Anchored Hearing Aid or Cochlear Implant and another unit e.g. in or at the car canal, or iii) arranging a unit of the hearing device as an entirely or partly implanted unit such as in Bone Anchored Hearing Aid or Cochlear Implant.

A "hearing system" refers to a system comprising one or two hearing aids, and a "binaural hearing system" refers to a system comprising two hearing aids where the hearing aids are adapted to cooperatively provide audible signals to both of the user's ears. The hearing system or binaural hearing system may further include auxiliary device(s) that communicates with at least one hearing aids, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing aid and the auxiliary device. The auxiliary device may be used for programming and/or reprogramming and/or adjusting settings for the hearing aid. Auxiliary devices may include at least one of remote controls, remote microphones, audio gateway devices, mobile phones, public-address systems, car audio systems or music players or a combination thereof. The audio gateway may be adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid. The remote control may be adapted to control functionality and operation of the at least one hearing aid. The function of the remote control may be implemented in a SmartPhone or other electronic device, the SmartPhone/electronic device possibly running an application that controls functionality of the at least one hearing aid.

In general, a hearing aid includes i) an input unit such as a microphone for receiving an acoustic signal from a user's surroundings and providing a corresponding input audio signal, and/or ii) a receiving unit for electronically receiving an input audio signal. The hearing aid further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal or transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

As the general number of features of the hearing aid itself raises, e.g. by including electrical components in the part located in the car canal, the requirement for communication bandwidth between the two parts increases. This could e.g. be due to inclusion of processor, filter, memory, microphone, sensor, battery, antenna, or combinations hereof, in the in-the-car-part. Therefore, there is a need to increase the possibilities of communication, and one solution could be to increase the number of twisted wires. However, this has, amongst other things, a drawback of increased risk of crosstalk between the wires.

FIG. 1 schematically illustrates an assembly 10 configured to be connected to a housing, which is configured to be positioned behind the ear of a user, i.e. in the space between the top of the pinna and the skull. This is often referred to as a behind-the-ear housing.

The behind-the-ear housing, not illustrated here, stores a variety of components, such as power source, one or more input transducers, processing units for processing the input signal(s), or other optional components. As will be explained later, the assembly 10 may comprise electrical components as well.

The assembly 10 have a generally oblong body at the midsection 16, with a speaker 12 at one end and a connector 14 at the other end. At the connector 14 a plug is formed, wherein the plug is shaped to mate with a corresponding socket in the behind-the-ear housing, e.g. as male/female type plug. In an alternative form, the connector 14 could be provided with a socket and the behind-the-ear housing with a protruding plug element. The behind-the-ear housing is a first part, the in-the-ear part is a second part, and the elongate member connecting them is a third part.

The connector may have a flex tab connector. When having such a flex tab connector, it is preferable that the flex tab connector is a bendable flex connector (also known as, for example, flexible connector, flex circuit connector, or flexible circuit connector) including conductive contacts constructed on a flex substrate (also known as flexible substrate, flex circuit substrate, or flexible circuit substrate). With conductive contacts (flex pads) made of mechanically flexible conductive traces such as copper traces, the connector is substantially bendable. The flex tab may be bendable but should retain its original shape when flexed within the materials flexible limits, i.e. without plastic deformation.

The assembly 10 in FIG. 1 is in some instances referred to as a speaker unit, i.e. the speaker 12 and the tube/cable/connector 16 and the housings at respective ends of the assembly 10.

Figure 2:
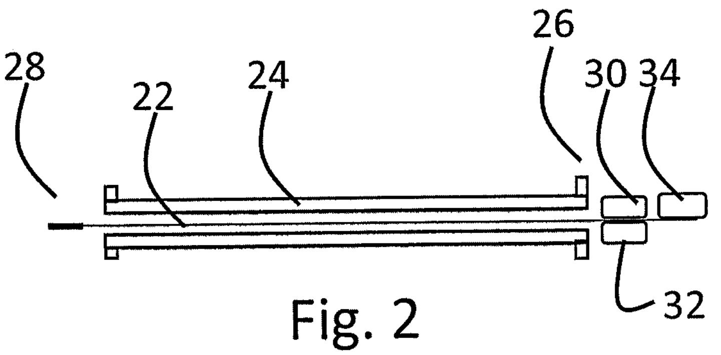
Figure 3:
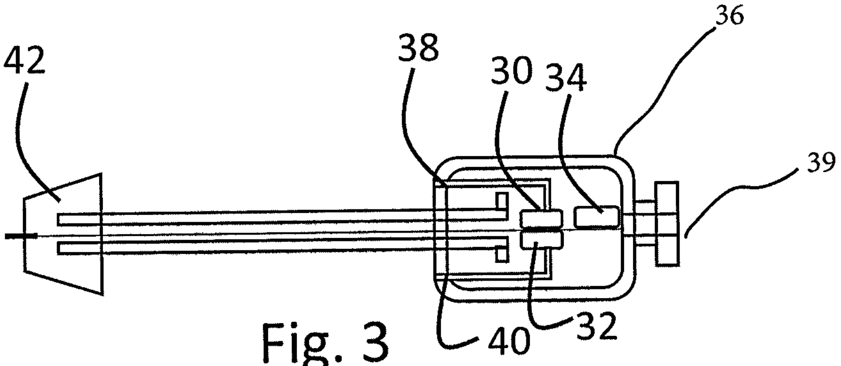

In FIGS. 2 and 3, the second part 12, i.e. the in-the-ear part, comprises an output transducer 34 configured to provide an acoustic signal to be provide to the user's ear canal. The output transducer is here a speaker with a plastic housing, which is adapted to have a dome attached. The dome has a soft surface that, when inserted into the ear canal, adapt to the ear canal so the user has as comfortable a fit as possible. Here the dome has a number of openings, but alternatively the dome may be closed. The dome is to be attached at the snap locking mechanism 18 at the distal end of the housing 20.

The third part, i.e. the elongate member 16, comprises a flexible circuit board, i.e. a flexible substrate, having a number of conductive paths. These conductive paths are at least part of a transmission path configured to provide electrical connection between the first part and the second part. Further, or alternatively, at least one conductive path in the third part 16 is part of an antenna.

In the schematic FIG. 2, the flexible substrate 22 is arranged within a tubing or protective cover 24. The flexible substrate 22 extends for a first length, and the tubing 24 extends for a second length, where the second length is greater than the first length. The protective cover or tubing 24, is mounted around the flexible substrate 22. This protective cover or tubing 24 is mounted along a part of the length of the flexible substrate 22. The protective coating or cover protects the flexible circuit board and the conductive paths from the environment, which at the ears can be harsh on electronics due to cerumen, sweat and other such bodily fluids.

The protective coating or tubing 24 comprises strengthening fibers increasing the pull strength of the third part. Aramid fibers are currently added, but other types of fibers may be used.

At one end 26, here the right-most end, of the flexible substrate 22, a number of components are mounted to the flexible substrate 22. Two inputs transducers, here microphones, 30 and 32 are mounted at the end 26. The two input transducers 30, 32 are mounted at respective opposite sides of the flexible substrate 22. An output transducer 34, here a speaker, is mounted to the flexible substrate 22. The output transducer 34 is mounted further from the end of the tubing 24 than the two microphones 30, 32. Other arrangements may be envisioned, e.g. at the side where both a microphone 30 and the speaker 34 is mounted, the speaker 34 could be mounted closer to the end of the tubing 24. The speaker 34 is adhered to the flexible substrate 22 so that the speaker 34 and the flexible substrate 22 are parallel. The speaker 34 has a longitudinal axis and the longitudinal axis and the flexible substrate 22 are parallel.

As seen in FIG. 3, the components 30, 32 and 34 may be encapsulated in a housing 36 to protect them from the environment in the user's ear. This could e.g. be the housing 20 in FIG. 1.

The components 30, 32, 34 are envisioned to be mounted in the housing 36 configured to be positioned in the ear canal of the user. This housing could be provided with a soft, pliable cover, e.g. a dome, or an individually shaped part shaped after the actual shape of the user's ear canal, or the like to increase the comfort for the user.

As seen in FIG. 3, the housing 36 provides the microphones 30, 32 with an inlet positioned so that the microphones 30, 32 has a main pickup direction pointing generally outwards of the user's ear canal. Such a microphone may be used for picking up sounds from the user's environment, e.g. sounds that are subsequently processed and presented to the user via the speaker 34. In an alternative, at least one of the inlets may be positioned so that when in place in the user's ear canal, the main pickup direction of one of the microphones 30, 32 is directed towards the ear drum of the user. This could allow for a range of possibilities, such as own voice detection, occlusion detection and counter measures for occlusion, or other suitable uses.

In further examples, a second speaker may be positioned on the flexible substrate. The speaker may be mounted parallel to the flexible substrate. This could e.g. allow for splitting the audio signal to be presented to the user in two parts, e.g. a high and a low frequency part. The frequency parts could e.g. be divided around 1 kHz, 2 kHz, 3 kHz, 4 kHz or other suitable frequency.

Other component types could be mounted at the flexible substrate 22. E.g. an inductive coil for inductive communication, a processor, a memory unit, a filter unit, a sensor, e.g. an EEG sensor, a battery, combinations hereof or any other useful component or components. These other types of components may be included in the housing 36, or they could be mounted on the flexible substrate 22 under or in the protective cover 24. Other wireless communication devices may be included in the hearing aid, e.g. an inductive coil for near field communication, e.g. to establish an inductive link to another hearing aid of a binaural system. The inductive link has an advantage in communicating more or less through the head of the wearer with minimal loss of energy. Further, an inductive coil, e.g. a T-coil or telecoil, may be included in the hearing aid. Such a 'telecoil systems' are often used in theaters, churches, train stations, ticket booths etc. for inductive communication to the hearing aid. One or both of the mentioned coils may be positioned in the area between the battery and one or the other end of the hearing aid. In one instance, one coil is located in the opposite end of the other coil. In addition to these at least two types of communication coils, wherein a hearing aid may comprise one or both of them, a further wireless communication device, e.g. in the form of an antenna may be included. This would, as is also expressed elsewhere in the present specification, allow wireless communication to other external units. This may be done using communication according to the Bluetooth protocol, such as using the Bluetooth Low Energy protocol, or similar protocols. This communication may be performed at 2.4 GHz or other suitable frequencies.

At the other end 28 of the flexible substrate 22, one or more connectors may be provided. Here, as seen in detail in FIGS. 4 and 5, four connectors configured to interface with a hearing aid is provided at both sides, in total eight connector conductors. It is clear that there may be more connectors, depending on e.g. the size, e.g. width, of the end of the flexible substrate and/or the size, e.g. width, of the individual conductors. Further, the flexible substrate 22 may be multi layered so that further conductors may be provided between the two outer layers.

In FIG. 3, the housing 36 of the in-the-car element has a snap connector 39 at the distal end so that a dome may be releasable connected to the housing 36 of the in-the-car element. A dome is contemplated to provide a comfortable mounting of the in-the-car part in the user's car canal. Further, having such a separate part, it is possible to provide a single-size housing with a variety of dome sizes to achieve the best combination of dome and housing for the individual user. The dome is less expensive to produce than the housing and the entire assembly. As the tip of the housing 36 is open to let sound be radiated from the speaker 34 towards the eardrum, when the speaker 34 is mounted in an car canal of a user, a debris filter may be included in the dome and/or speaker 34. This debris filter is intended to protect the opening of the speaker 34 from cerumen, oil, debris etc. from the ear canal and surroundings.

Two microphone openings 38 and 40 are provided in the housing of the in-the-ear part. Here the two microphone openings 38, 40 are orientated towards the surroundings. In other versions of the housing 36, one of the microphone openings 38, 40 could be orientated towards the ear drum, i.e. in the same direction as the distal end with the snap connector 39.

The housing 36 has a generally cylindrical form, other geometries may be envisioned, e.g. a square or oblong cross section in a direction perpendicular to the longitudinal axis of the housing 36. Further components may be included in the housing 36, although not illustrated here. This could e.g. be sensors for sensing temperature, pressure, EEG, accelerometers, gyro sensors or other direction/inclination/orientation sensors. Further electrical components could be included in the housing 36, such as a memory device, a processor, a filter, an analogue-to-digital converter or any combinations hereof.

The housing 20, 36 of the speaker 12, 34 may be formed from any of a variety of materials, e.g. hard plastic material or the like, such as TPU, TPE, Pebax, Rilsan, or any other suitable material.

Figure 4:
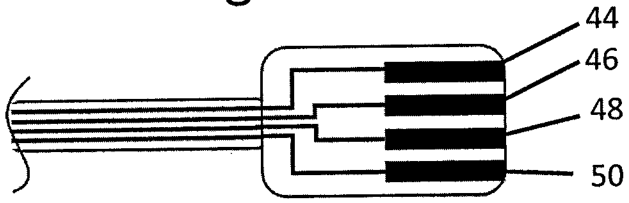
Figure 5:
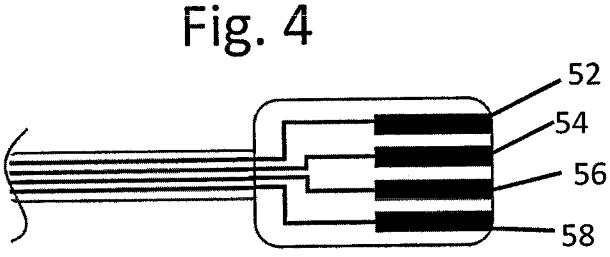

FIGS. 4 and 5 schematically illustrate two sides of the end of the flexible substrate 22 where the connections are formed. The connections are formed so as to connect with mating contacts in the hearing aid housing. Hereby electrical connections between elements in the behind-the-ear part and the in-the-ear part is established.

In FIG. 4 the connection 44 is for supply voltage, the connection 46 is a ground line, the connection 48 is a clock line and the connection 50 is a data line.

In FIG. 5 the connections 52 and 54 are for the speaker signal from a processor in the behind-the-ear housing, the connections 56 and 58 are connections for the microphones 30 and 32 to the processor in the behind-the-ear housing.

Four conductive paths are illustrated at each side, providing a total of eight connections. In other versions more or less connections could be present.

Figure 6:
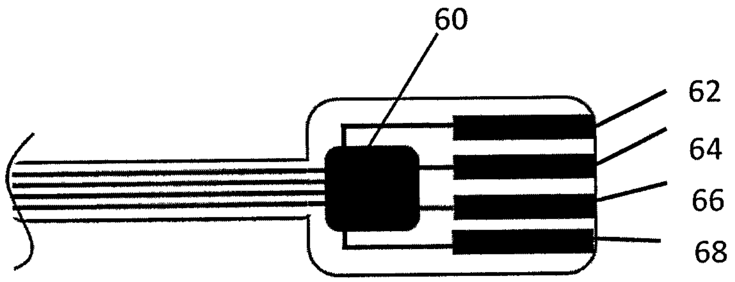

FIG. 6 schematically illustrate a connector part of the flexible substrate where a component 60 is mounted on the flexible substrate. Here the component 60 is a memory chip. Connections 62 and 64 are here used for connection to the speaker, and connections 66 and 68 are here used for the microphone.

Figure 7:
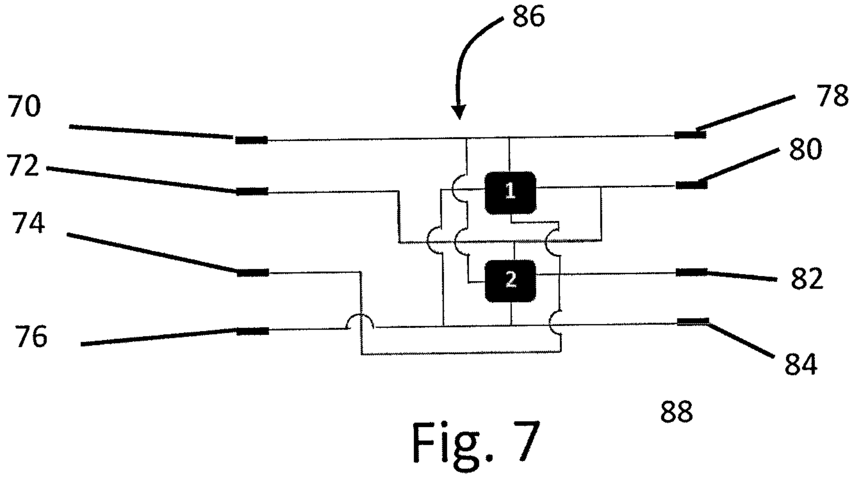

FIG. 7 schematically illustrates an electrical network 86 where connections 70 and 78 are Vpad, connections 72 and 80 are ground connection, connections 74 and 82 are clock lines, and connections 76 and 84 are data lines.

Figure 8:
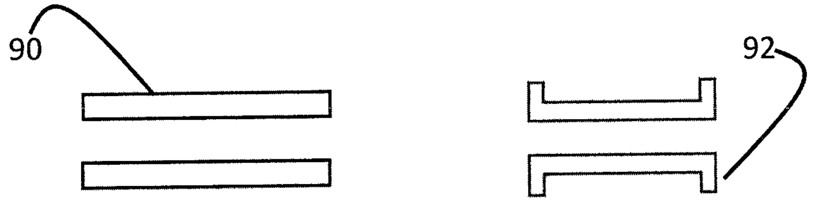

FIG. 8 schematically illustrate the start of the process of mounting a protective cover to a flexible substrate. The process starts with a tube-shaped protective cover 90 of a predetermined length, the protective cover 90 having a first tube end, or a first protective cover end, and an opposite second tube end, or second protective cover end. In the left-hand illustration, the protective cover 90 is provided as a straight tube, and in the right-hand illustration, the protective cover 90 is provided with a rim 92, which serve for clamping during the subsequent processing. A rim 92 may be formed in the straight tube 90 for easier handling during the subsequent processing. A machine is used for grabbing, i.e. clamping, the rim 92 and the protective cover 90 is then pulled or stretched, e.g. as illustrated in FIG. 9.

Figure 9:
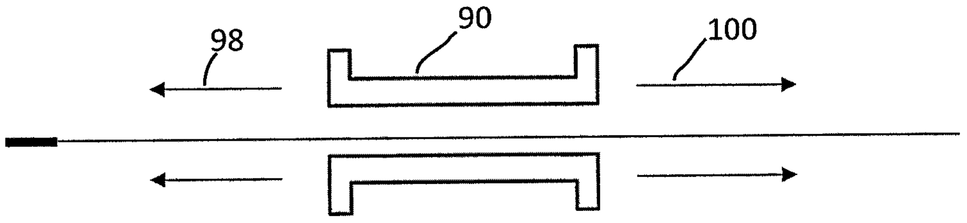

As illustrated in FIG. 9 the protective cover or tubing 90 is pulled along the arrows 98 and 100. Depending on the material used for the protective cover or tubing 90 optionally, a heat source may be provided to soften the protective cover or tubing during the pull process. The pull-part of the process may end when the protective cover or tubing 90 encloses the substrate 22 sufficiently.

Figure 10:
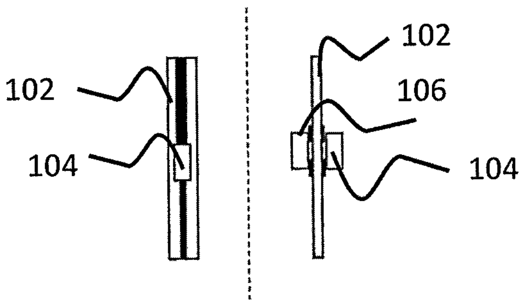
FIGS. 10-12 are schematically illustrations of different arrangements of conductive paths and components on flexible substrates, FIG. 13 schematically illustrates a flexible substrate disposed in the cavity of a tube or cover, FIG. 14 schematically illustrates a cut-through view of a cover having an air guide part, FIGS. 15-27 schematically illustrates various arrangements of conductive paths in and on a flexible substrate.
Figure 11:
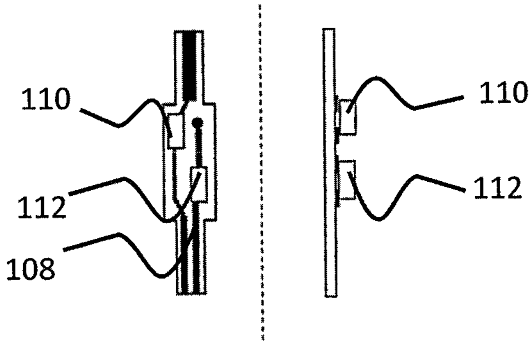
Figure 12:
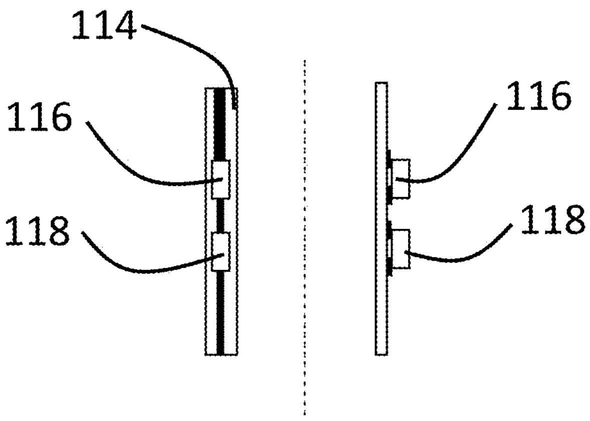

FIGS. 10-12 are schematic illustrations of different arrangements of conductive paths on a flexible substrate to be used in a connector as described herein. Further, shown herein two components are arranged on the flexible substrate. The illustrations 10-12 indicate that at least in one area of the flexible substrate two (electrical) components are arranged, however, at other locations of the flexible substrate further electrical components may be arranged.

In the FIGS. 10-12, the two components have been illustrated to the same outer contour, but in other arrangements the two components could be different from each other. In some instances, one component may be larger than the other. In some instances, one component may have a different geometry than the other.

FIG. 10 schematically illustrates a flexible substrate 102 having a first component 104 mounted thereon. On the left-hand side the flexible substrate 102 is seen in a front view, and on the right-hand side in a side-view, i.e. 90 degrees turned. As seen in the right-hand side, a second component 106 is mounted on the opposite side of the flexible substrate 102 than the first component 104. The two components 104 and 106 are mounted directly opposite each other. In this arrangement, the width of the flexible substrate may be constant in the area where the components are arranged, but the thickness in that area will increase.

FIG. 11 schematically illustrates a flexible substrate 108 where two electrical components 110 and 112 are mounted on the same side of the flexible substrate 108. Here the width of the flexible substrate has been increase in the area where the two electrical components 110 and 112 are arranged. The thickness at the area with the electrical components 110 and 112 is less than the thickness in the area with the electrical components 104 and 106 illustrated in FIG. 10.

FIG. 12 schematically illustrates a flexible substrate 114 having two electrical components 116 and 118 mounted in series on the same side of the flexible substrate 114.

A conductive path used as antenna, or at least as part of an antenna, especially an antenna externally from the housing of a behind-the-ear part, may have one of a variety of different shapes depending on the intended use and especially the carrier frequency for the antenna.

Interoperability of the hearing aid device and other devices are presently often performed at 2.4 GHz. The conductive path used as antenna may be sized to maximize the coupling of an electromagnetic signal at 2.4 GHz. Further, the antenna may include a trap as described above, to define an appropriate antenna length. This could be achieved by using components as illustrated in FIGS. 10-12.

The hearing aid comprises a transceiver, e.g. a radio chip packaging data according to a protocol and outputting a signal to the antenna and/or receiving a signal via the antenna and transforming the received signal to a data signal. A matching circuit may be included between the transceiver and the antenna, this circuit will match the output impedance of the transceiver and the input impedance of the antenna, both for reception and transmission. The electrical length of the antenna, i.e. the length experienced by the signal either being transmitted or received, may be augmented by a reactance mounted in series with the antenna, thereby changing the electrical length of the antenna without changing the physical length. The resonance of the antenna is altered by the reactance.

If a transceiver with an balanced output is used, and e.g. a single line antenna is used, a so-called balun may be included. This balun will transform the balanced output signal of the transceiver to an unbalanced signal to be outputted via the antenna.

The transceiver may encode the data to be transmitted, and decode the data received, or may alternatively be coupled to a separate decoder/encoder unit.

Figure 13:
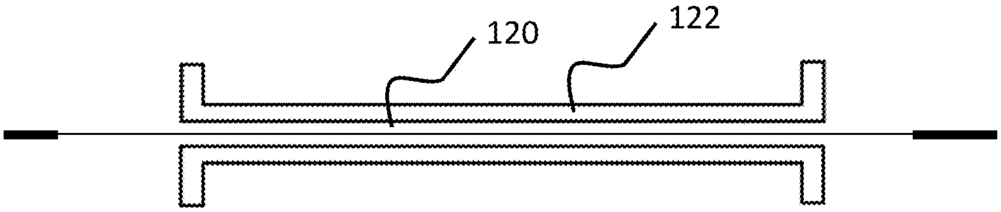

FIG. 13 schematically illustrates a flexible substrate 120 disposed in the cavity of a tube 122 which is to be stretched so as to form a tight fit to the flexible substrate 120. This is illustrated in the state before the tube 122 is shrunken to fit around the flexible substrate.

Figure 14:
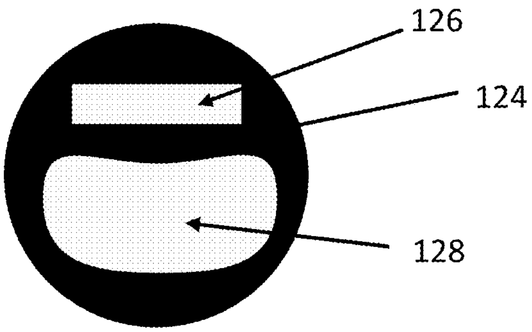

FIG. 14 schematically illustrates a cross-section of a connector where a cladding or cover 124 has a substrate 126 embedded therein. The substrate 126 includes two or more conductive paths as described in connection with other figures herein, not illustrated here. An air guide 128 is formed in the cladding or cover 124. Compared to e.g. the protective cover or tubing 90 of FIG. 9, the cover 124 comprises two compartments, one for storing the substrate 126 and one serving as air guide 128. The air guide 128 is configured to bring sound from a speaker in a housing to be positioned behind the ear of the wearer to an earplug, i.e. an in-the-ear part. From the earplug sound is radiated into the ear canal of the wearer. In one version the hearing aid could combine a speaker in the behind-the-ear part and a second speaker in the in-the-ear part, which two speakers could be configured to operate at different frequencies, e.g. one speaker for low frequencies and another speaker for higher frequencies.

Figure 15:
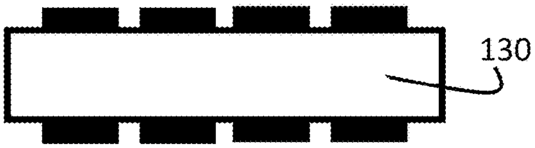

FIG. 15 is a schematic illustration of a cross-section of a substrate 130 having four conductors on a first side, here the top side, and four conductors on a second, opposite side, here the bottom side. The conductors, or conductive paths, all have similar geometries, including similar width and height. The conductors are arranged directly opposite each other.

Figure 16:

FIG. 16 is a schematic illustration of a cross-section of a substrate 140 having three conductors on a first side, here the top side, and four conductors on a second, opposite side, here the bottom side. Except for the middle conductor on the first surface, the conductors, or conductive paths, all have similar geometries, including similar width and height.

Figure 17:
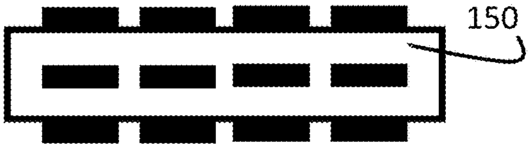

FIG. 17 is a schematic illustration of a cross-section of a substrate 150 having four conductors on a first side, here the top side, and four conductors on a second, opposite side, here the bottom side. The conductors, or conductive paths, all have similar geometries, including similar width and height. The conductors are arranged directly opposite each other. Compared to the substrate 130 of FIG. 15, the substrate 150 include an additional row of conductors disposed within the substrate. The additional row of conductors are embedded in the substrate.

Figure 18:
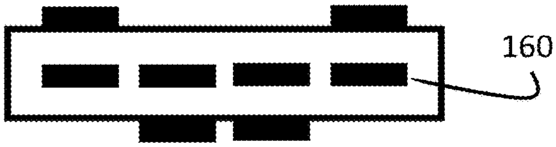

FIG. 18 is a schematic illustration of a cross-section of a substrate 160 having two conductors on a first side, here the top side, and two conductors on a second, opposite side, here the bottom side, and further a number of conductors embedded in the substrate. The conductors, or conductive paths, all have similar geometries, including similar width and height. The conductors on the first and second sides are arranged displaced relative to each other.

Figure 19:
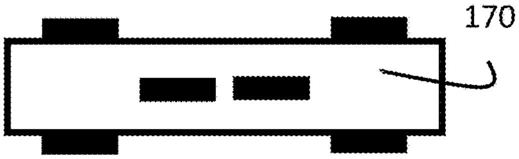

FIG. 19 is a schematic illustration of a cross-section of a substrate 170 having two conductors on a first side, here the top side, and two conductors on a second, opposite side, here the bottom side, and further two conductors are embedded in the substrate. The conductors may be grouped, e.g. so that two conductors carry signals to a speaker in the in-the-ear and two carry signal from a microphone, or other component such as a processor, in the in-the-ear part to a receiving element in the behind-the-ear part. Further, one or more conductors may act as ground for one or more of the other conductors. Still further, one or more components may be used as a shield element so as to reduce crosstalk between the signal carrying conductors. This is not only the case for the embodiment illustrated in FIG. 19, but a shielding may be included in other embodiments as well, either by a separate element or by utilizing one of the illustrated conductors as a shield.

The coupling element may comprise one or more shield elements for shielding the external antenna such that electrical elements within the first portion, the second portion, the external part and/or external devices will not be affected negatively by radiation from the antenna which has a frequency outside the frequency range of about 2.45 GHz to about 5.5 GHz, or between 2.44 GHz to 5.5 GHz or about the frequency of 2.45 GHz or about the frequency of 5.5 GHz. The shield element may be connected to the wireless interface via a bandpass filter, or the shield element may be connected to the ground plane within the first portion. The shield element may be a wire twisted around the flexible substrate or a net, such as a net of wires, arranged around the electrically conductive elements.

Figure 20:

FIG. 20 is a schematic illustration of a cross-section of a substrate 180 having three conductors on a first side, here the top side, and four conductors on a second, opposite side, here the bottom side, and further two conductors are embedded in the substrate.

Figure 21:

FIG. 21 is a schematic illustration of a cross-section of a substrate 190 having two conductors on a first side, here the top side, and four conductors are embedded in the substrate, no conductors are located on the opposite side, here the bottom side.

Figure 22:

FIG. 22 is a schematic illustration of a cross-section of a substrate 200 having four conductors embedded in the substrate.

Figure 23:

FIG. 23 is a schematic illustration of a cross-section of a substrate 210 having two rows of four conductors embedded in the substrate. Further, two conductors are arranged on a first side, here the top side.

Figure 24:
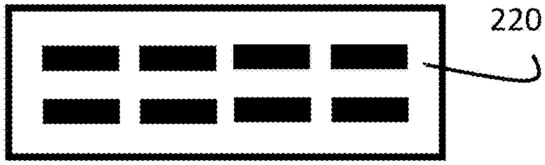

FIG. 24 is a schematic illustration of a cross-section of a substrate 220 having two rows of four conductors embedded in the substrate.

Figure 25:
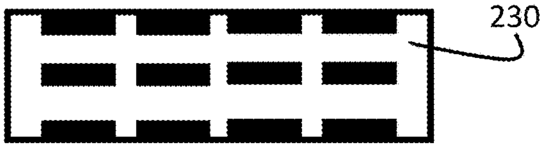

FIG. 25 is a schematic illustration of a cross-section of a substrate 230 having three rows of conductors embedded in the substrate, where to rows closest to the surface is arranged so that they are exposed at the surface of the substrate.

Figure 26:
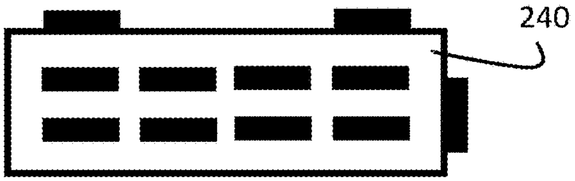

FIG. 26 is a schematic illustration of a cross-section of a substrate 240 having two rows of conductors arranged inside the substrate. Two conductors are arranged at a first side, here the top side, and a further conductor is arranged at a side, i.e. a side substantially perpendicular to the first side.

Figure 27:

FIG. 27 is a schematic illustration of a cross-section of a substrate 250 having two rows of conductors embedded in the substrate, where the rows are arranged so that they are exposed at the surface of the substrate.

Figure 28:
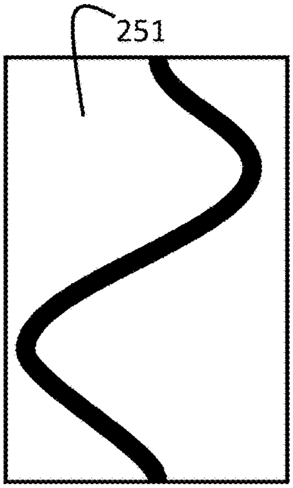
FIGS. 28-30 are schematic illustrations of conductive paths on, or in, a flexible substrate, FIG. 31 schematically illustrate three versions of an interface between a cable and a plug, FIG. 32 schematically illustrates two different options for establishing connection from a flexible substrate to three pins, FIG. 33 schematically illustrate an assembly and an adaptor, and FIG. 34 schematically illustrate a hearing aid.

FIG. 28 is a schematic illustration of a conductor to be used as part of an antenna. The conductor is disposed on an outer surface of a substrate 251. The conductor is arranged in a non-linear configuration. This is contemplated to allow a longer physical length compared to having a straight conductor disposed on the surface of the substrate. The physical length of the conductor may then be better adapted to an operational length of the antenna.

Figure 29:
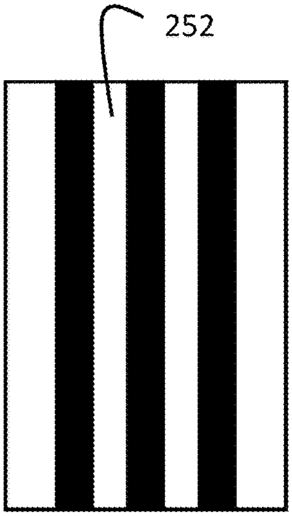

FIG. 29 is a schematic illustration of a surface part of a substrate 252 where three conductors are disposed on the surface.

Figure 30:
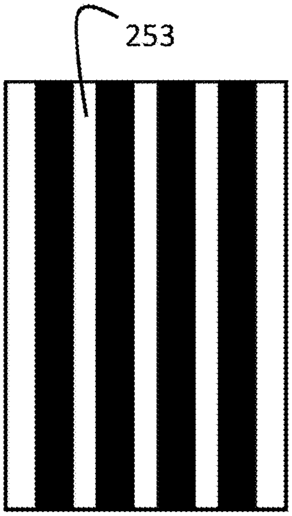

FIG. 30 is a schematic illustration of a surface part of a substrate 253 where four conductors are disposed on the surface. The conductors on the substrates 252 and 253 are arranged parallel to each other with substantially equal distances to neighbouring conductor. Other arrangements are possible.

Figure 31:
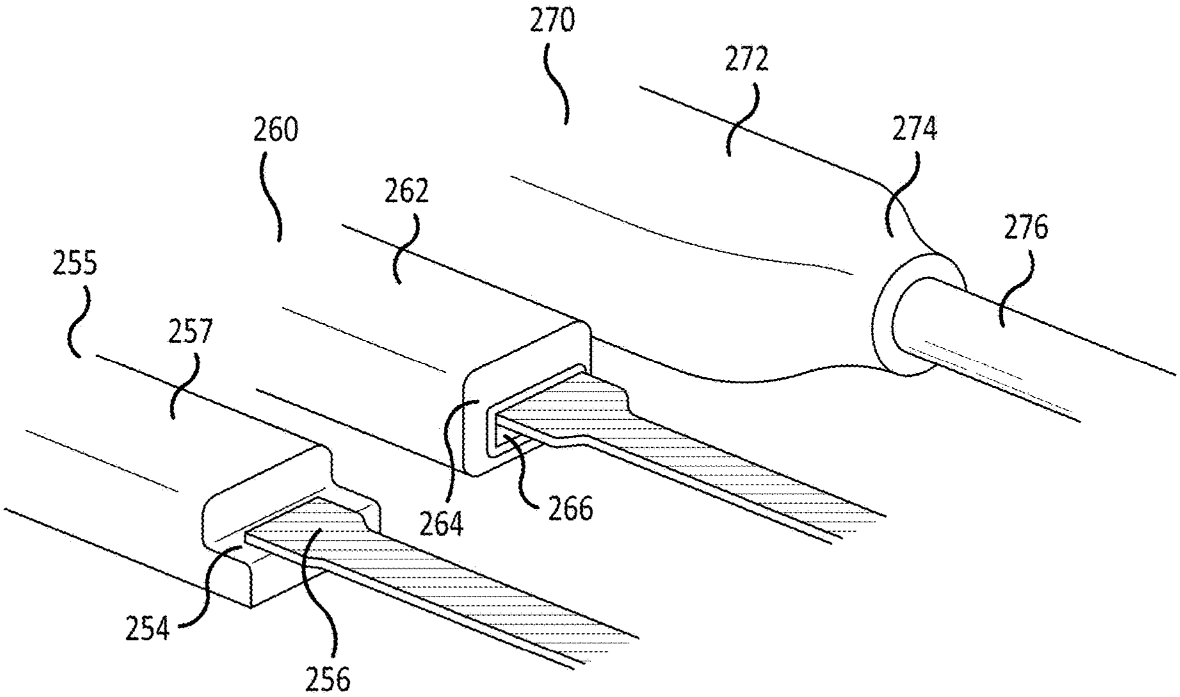

FIG. 31 is a schematic illustration of three versions of an interface between a cable and a plug or adaptor 255, 260 and 270.

The adaptor 255 comprises a body 257 having a ledge or protrusion 254 whereon the connector, or flexible substrate 256, is attached. This arrangement could allow for a space optimized arrangement and/or pull-strength optimized solution.

In the adaptor 260, the connection from the third part to the body 262 at a flat end 264 is established at a part 266 of the third part having a 90 degree bend, or at least nearly 90 degrees bend. The bend part 266 is attached to the housing at the flat end 264. One advantages of this configuration is that the space inside the adaptor 260 may be better utilized comparted to the adaptor 250.

In the adaptor 270 the third part 276 extends into the housing 272. The housing 272 comprises a part 274 that surrounds, and stabilizes, the third part 276. The adaptor 270 is contemplated to have a high mechanical stability and allow the user to remove the plug or adaptor 270 from a socket many times with low risk of breaking the adaptor at the interface between the adaptor housing 272 and the third part 276.

Figure 32:
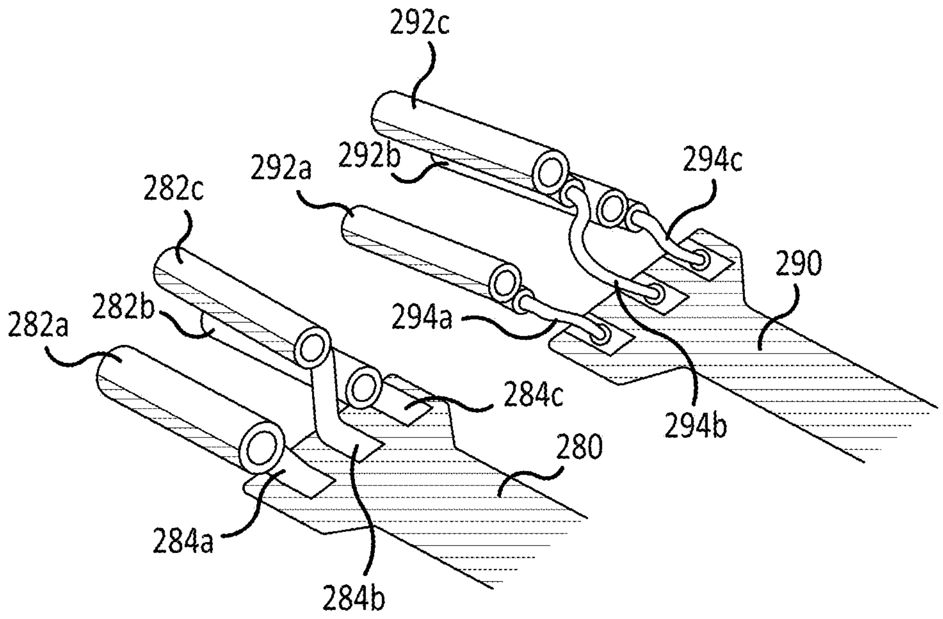

FIG. 32 schematically illustrates two different options for establishing connection from the substrate 280 and 290 to three pins, 282*a, b* and *c* and 292*a, b* and *c* respectively, the pins being configured to connect to mating plug with three corresponding receptacles.

At the substrate 280 the three pins 282*a, b* and *c*, are connected to electrically conductive leads in the substrate 280, not seen here, via respective substrates 284*a*, 284*b*, 284*c*. At the substrate 290 three pins 292*a, b* and *c*, are connected to leads in the substrate 290 via respective vias 294*a*, 294*b*, 294*c*.

Figure 33:
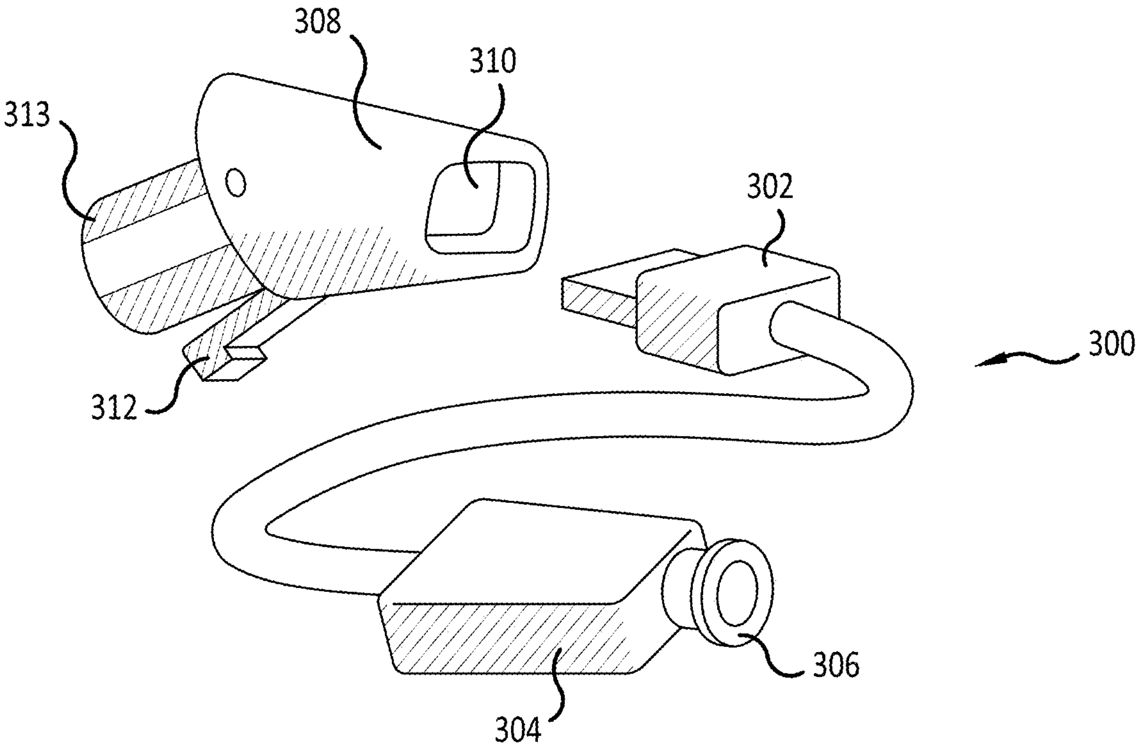

FIG. 33 schematically illustrates a third part 300 having a plug 302 at one end and a speaker unit 304 at the other end thereof. Here speaker unit is understood as the plastic housing surrounding a speaker and any other optional parts therein, such as one or more microphones, processor and/or memory unit. The speaker unit 304 is configured to attach to a dome at 306 so as to make the speaker unit more comfortable to the user. An adaptor 308 is configured to be mounted in the housing of the hearing aid, i.e. in the behind-the-ear part not illustrated here. The adaptor 308 have a rectangular shaped opening 310 configured to receive the plug 302. At one side, the adaptor 306 is configured to receive a flex tab 308, such as the flex tab of FIGS. 4-6, i.e via the opening 310. At the opposite side, at 313, a number of pins extend, alternatively as illustrated here a number of receptacles are formed, here 3 receptacles. The pins are configured, e.g. shaped and positioned, to mate with a plug in the hearing aid device body. This way the adaptor adapts the flex tab connector so as to fit with e.g. a standard CS44 or CS45 plug of a hearing aid. Appropriate wiring and/or conductive traces are provided in the adaptor 308 to establish electrical connection between the flex tab connector 302 and the pins in the behind-the-car housing. Further, impedance matching components may be added in the adaptor 308.

At the end opposite the opening 308, the adaptor 302 have a tab 312 configured to retain the adaptor 308 in the housing of the behind-the-ear part, not illustrated here. This is contemplated to allow great mechanical stability to the combined system, which is e.g. important when the user pull the in-the-car part out of the car canal. Typically, the user will pull the housing of the behind-the-car part to dismount the hearing aid from the car.

Figure 34:
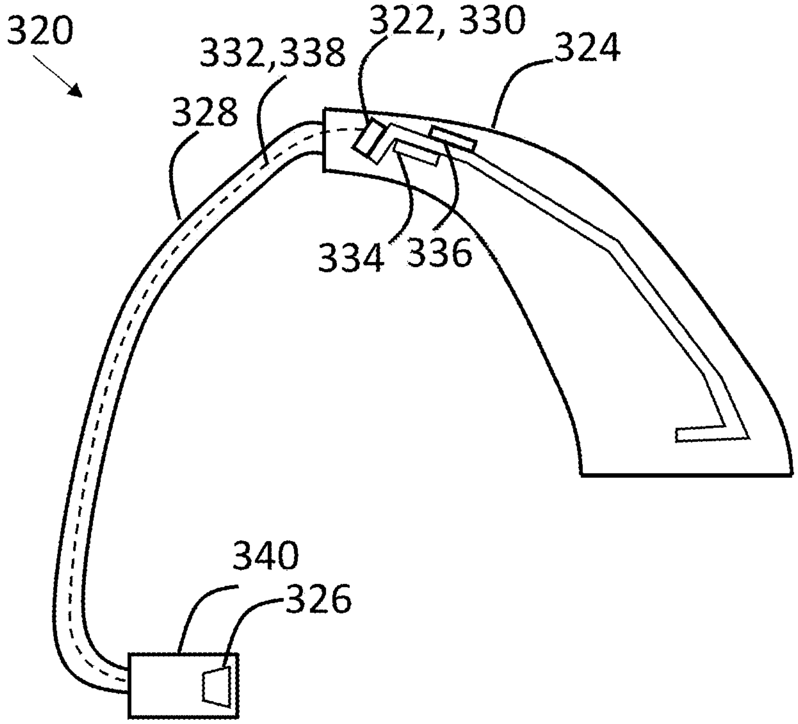

FIG. 34 schematically illustrate an example of a hearing device 320 and an example of the antenna 322 within the hearing device 320. The hearing device 320 comprises a first portion 324 adapted for being arranged behind an car of a user for providing a signal, an output transducer 326 for converting the signal to an acoustic output, a coupling element 328 coupling to the first portion 324, an antenna 322 comprising an external antenna 332 arranged at least externally to the first portion 324 and an internal parasitic element 330, a feeding unit 334 configured to supply a current to the external antenna 332, and the feeding unit 334 is further configured to supply the current to the internal parasitic element 330 via a wireless (capacitive) coupling, a wireless interface 336 for receiving and/or transmitting data by means of the antenna 322, and wherein the coupling element 328 comprises the external antenna 332. In this specific example, the hearing device 320 further comprises a second portion 4 adapted for being arranged distantly from the first portion 324 and for providing the acoustic output to the user, where the second portion 4 includes the output transducer 326. The coupling element 328 is coupling the first portion 324 and the second portion 340, and wherein the coupling element 328 is adapted for transmitting at least the signal to the output transducer 326, and wherein the coupling element 328 comprises an electrically conducting element 338, here a flexible substrate, coupled to the wireless interface 336, and wherein at least one of the electrically conducting paths of the flexible substrate 338 is at least a part of the external antenna 332.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid comprising:

a behind-the-ear housing configured to be positioned at or behind an ear of a user, wherein the behind-the-ear housing comprises an input transducer and an internal antenna fully arranged within the behind-the-ear housing;

an in-the-ear housing configured to be positioned at or at least partly in an ear canal of the ear, wherein the in-the-ear housing comprises an output transducer; and an elongate member having a connector at one end thereof, the connector being configured to mate with a receptacle in the behind-the-ear housing, the elongate member comprising a flexible body extending from the receptacle in the behind-the-ear housing to the in-the-ear housing and configured to electrically connect the behind-the-ear housing with the in-the-ear housing, the elongate member further comprising a flexible substrate having a plurality of electrical connections, wherein the flexible substrate extends along the entire length of the flexible body from the receptacle of the behind-the-ear housing to the in-the-ear housing;

wherein the flexible substrate comprises a first side and a second side opposite the first side, wherein at least a first portion of the plurality of electrical connections are formed at the first side of the flexible substrate and at least a second portion of the plurality electrical connections are formed on the second side of the flexible substrate.

2. The hearing aid according to claim 1, wherein the flexible body surrounds the flexible substrate so as to form a protective member along the length of the flexible substrate.

3. The hearing aid according to claim 1, wherein the behind-the-ear housing further comprises a wireless interface coupled to the flexible substrate.

4. The hearing aid according to claim 1, wherein the flexible substrate has a rectangular cross section, and/or wherein the flexible substrate is a multi-layer flexible circuit board where at least part of the plurality of transmission paths are formed on respective opposite sides of the flexible substrate.

5. The hearing aid according to claim 1, wherein the behind-the-ear housing comprises an interface having a plurality of pins or sockets and the connector includes a tab connector, the hearing aid further comprising an adaptor having a first end configured to interface with the plurality of pins or sockets and a second end configured to interface with the tab connector.

6. The hearing aid according to claim 1, wherein the internal antenna fully arranged in the behind-the-ear housing is an internal parasitic antenna element, the internal parasitic antenna element being tuned to the operation frequency of the hearing aid.

7. The hearing aid according to claim 6, wherein the connector comprises an external antenna.

8. The hearing aid according to claim 7, further comprising an antenna trap arranged at a position between ends of the flexible substrate, the antenna trap isolating the external antenna so as to define antenna length in connection with the external antenna.

9. The hearing aid according to claim 8, wherein the antenna trap is configured so that an operational frequency of the external antenna is a carrier frequency of around 2.4 GHz.

10. The hearing aid according to claim 7, wherein the hearing aid further comprises a feeding unit configured to supply current to the internal parasitic antenna element and the external antenna part.

11. The hearing aid according to claim 1, wherein the in-the-ear housing includes one or more sensors selected from the group including sensors for sensing temperature, pressure, EEG, accelerometers, gyro sensors or other direction/inclination/orientation sensors.

12. The hearing aid according to claim 1, wherein the in-the-ear housing includes a memory device and/or a processor and/or a filter device.

13. The hearing aid according to claim 1, wherein the in-the-ear housing includes a first input transducer, and the hearing aid further comprises a processor in the behind-the-ear housing and/or in the in-the-ear housing, configured to process the output from the first input transducer.

14. The hearing aid according to claim 13, wherein the in-the-ear housing further comprises a second input transducer, and the processor is further configured to process audio signals based on output from both the first input transducer and the second input transducer.

15. The hearing aid according to claim 1, further comprising a processor, in the behind-the-ear part and/or in the in-the-ear part, configured to process the output from the input transducer so as to compensate for a hearing loss of the user.

16. A hearing aid comprising:

a behind-the-ear housing configured to be positioned at or behind an ear of a user, wherein the behind-the-ear housing comprises an input transducer, an antenna fully enclosed by the behind-the-ear housing, a wireless interface arranged in the behind-the-ear housing and configured to receive and/or transmit data using the antenna, an in-the-ear housing configured to be positioned at or at least partly in an ear canal of the ear, wherein the in-the-ear housing comprises an output transducer;

an elongate member having a connector at one end thereof, the connector being configured to mate with a receptacle in the behind-the-ear housing, the elongate member comprising a flexible body extending between the behind-the-ear housing and the in-the-ear housing, the elongate member further comprising a flexible substrate that electrically connects the behind-the-ear housing with the in-the-ear housing, the flexible substrate extending along the entire length of the flexible body from the receptacle of the behind-the-ear housing to the in-the-ear housing;

wherein the flexible substrate comprises multiple electrical connections.

17. The hearing aid according to claim 16, wherein the connector comprises a plug housing and wherein a memory unit is arranged in the plug housing.

18. The hearing aid according to claim 16, wherein a memory unit is arranged in the in-the-ear-housing.

19. The hearing aid according to claim 16, further comprising an antenna trap configuring the antenna to have two operational frequencies.

* * * * *